E. M. SORLEY.
Cultivator.

No. 56,286. Patented July 10, 1866.

Witnesses:
Jas. A. Serine
J. W. Hovington

Inventor:
Edith Sorley
Per Munn & Co.
Attorneys

UNITED STATES PATENT OFFICE.

E. M. SORLEY, OF NEENAH, WISCONSIN.

IMPROVEMENT IN CULTIVATORS.

Specification forming part of Letters Patent No. 56,286, dated July 10, 1866.

*To all whom it may concern:*

Be it known that I, E. M. SORLEY, of Neenah, in the county of Winnebago and State of Wisconsin, have invented a new and Improved Cultivator and Drag-Frame; and I do hereby declare that the following is a full, clear, and exact description thereof, which will enable others skilled in the art to make and use the same, reference being had to the accompanying drawings, forming part of this specification, in which—

Figure 1:
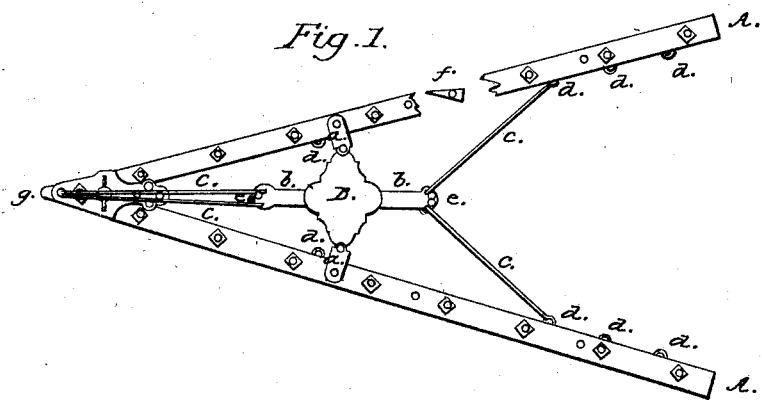
Figure 2:
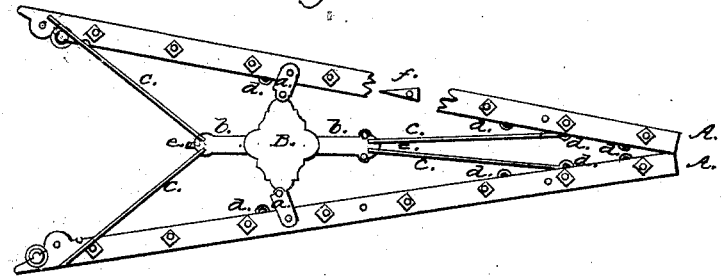
Figure 3:
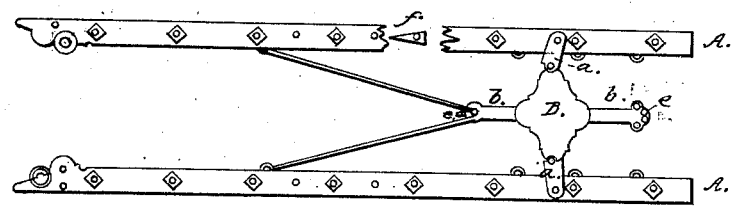
Figure 4:
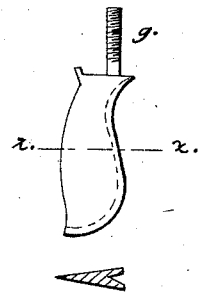

Figure 1 represents the implement as a cultivator. Fig. 2 represents it as a drag. Fig. 3 represents it as a drilling or furrowing implement. Fig. 4 is a side view of a harrow-tooth or cultivator. Fig. 5 is a cross-section of the same in the line $x\ x$.

Similar letters of reference indicate like parts.

This invention relates to agriculture or farm work, and is designed as a convenient and useful tool for breaking the surface of stiff clayey soils by means of peculiarly-shaped mold-board, sharp and pointed harrow-teeth with hollow backs, for penetrating and plowing the soil readily, for cultivating and loosening the soil between crops in rows or drills, and for furrowing or drilling in rows for planting. For these several purposes it is made adjustable by very simple changes in form and in the position of the teeth or cultivators, adapted to either a one-horse or two-horse team, and is extremely handy and useful, doing the work thoroughly.

To enable others skilled in the art to understand my invention, I will proceed to describe the same.

The frame A is made of two sides to adjust in the usual V form of this class of farm implements when used as a cultivator, as shown by Fig. 1, with a draft-eye, $g$, at the head. The two sides of the frame are connected by an adjustable or jointed center cross-bar or block, B, which hinges or pivots on side bars, $a\ a$, screwed to the top of the frame.

The block or cross-bar B has arms $b\ b$ extending longitudinally down the middle in the line of draft, to which are attached four connecting-rods or iron braces, $c\ c\ c\ c$, which hook into staples or eyes $d\ d\ d\ d$ on the inside of the frame, for the purpose of giving stiffness and steadiness to the implement when in use. The eyes are set apart so as to be used at different points of connection with the rods $c\ c\ c\ c$ in adjusting to different uses.

On both ends of the arms $b\ b$ are eyes $e\ e$ for attaching the draft-chain or whiffle when used as a drag, Fig. 2, or as a drilling-machine, Fig. 3, by which the line of draft is always kept in the middle of the machine to preserve its balance and make it work evenly over the surface of the ground.

The harrow-tooth or cultivator has a form, when viewed sidewise, resembling a saber or pruning-knife, Fig. 4, and is made of iron or steel, with a sharp edge and point or snake-head, to penetrate and pry up the soil in front, the sides flaring out like the mold-board of a plow, and a hollow or channel between them in the back part, as seen in Fig. 5, which conducts the warm surface air down into the ground to the full depth it goes, rendering the soil more friable. The top of the harrow-tooth is a screw-bolt, $g$, which passes through the frame A, and is secured by a nut, the use of which is to shift the position of the teeth when the machine is changed from the V form of a cultivator to that of a drag or drill, always adjusting them with the points in the line of draft, as shown at $f\ f\ f$ in Figs. 1, 2, and 3.

The adaptations and uses of this machine are so simple and obvious that any farmer can understand the operation without further explanation.

Having thus described my invention, what I claim as new, and desire to secure by Letters Patent, is—

1. The jointed adjustable cross-bar B, with arms $b\ b$, in combination with the shifting braces $c\ c\ c\ c$ and the side frame, A, constructed and arranged substantially as and for the purposes herein described.

2. The construction and arrangement of the shifting screw-headed and saber-shaped harrow-teeth or cultivators with hollow backs, in combination with the frame A and the adjustable center cross-bar, B, with its draft-arms $b\ b$, applied and operated as herein stated.

E. M. SORLEY.

Witnesses:
 C. C. TOWNSEND,
 GEO. W. EDWARDS.